Patented Apr. 22, 1952

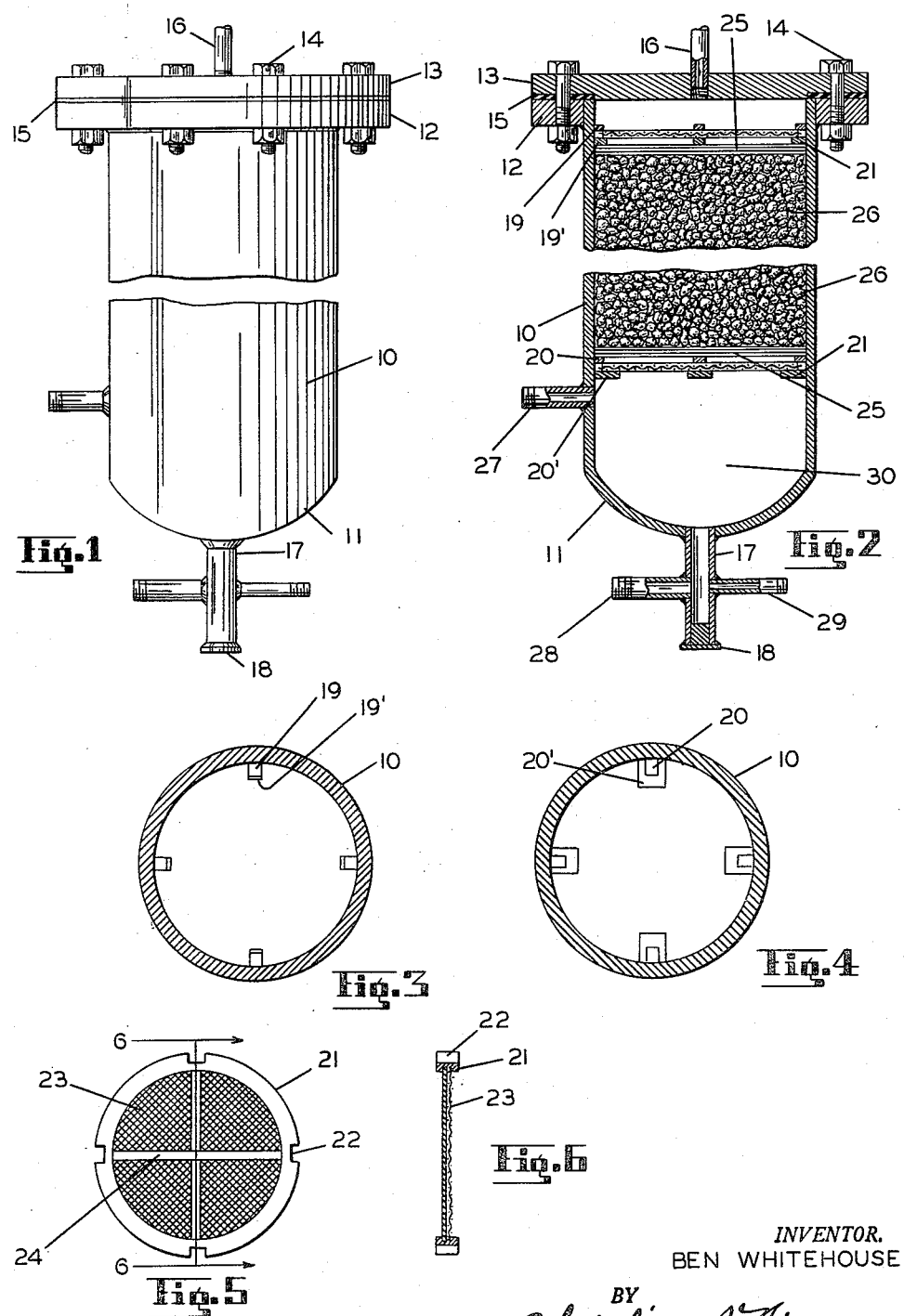

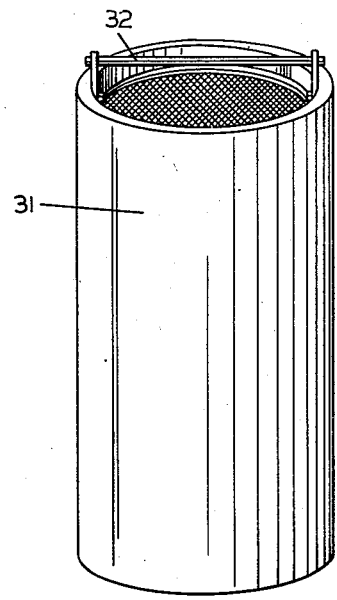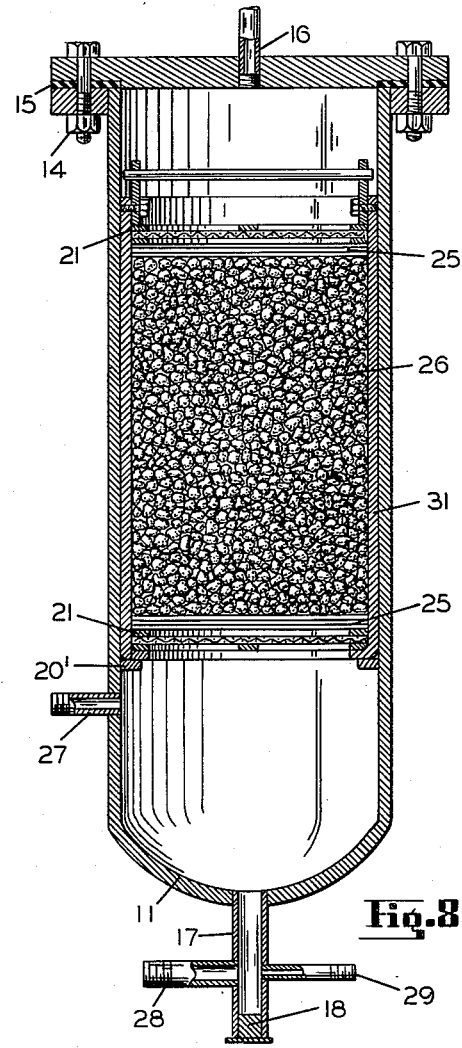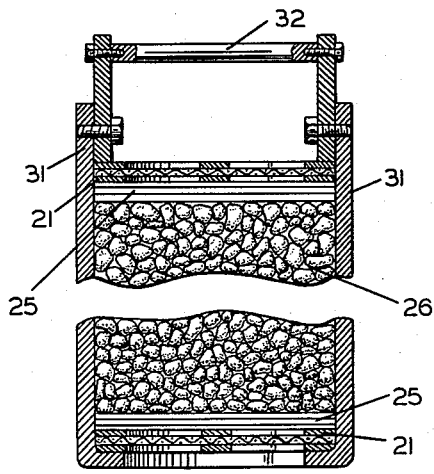

2,593,639

UNITED STATES PATENT OFFICE 2,593,639

FILTER

Ben Whitehouse, Milwaukee, Wis., assignor to Rodwell Engineering and Sales Company, Omaha, Nebr.

Application June 17, 1947, Serial No. 755,159

1 Claim. (Cl. 210—140)

My invention relates to improvements in filters and more particularly to a type of filter employed in the circulation of water within high or low pressure systems, in steam or hot water boilers.

The object of my invention is to provide a device for filtering impurities and sediment prevalent in water used in pressure boilers, where internal water treatment is employed.

Another object of my invention is to provide a device that may be installed within the circulating pipe system of a boiler.

Still another object of my invention is to provide a device that has no moving parts to become inoperative and that operates as a self-contained sealed unit that may be left unattended.

A still further object of my invention is to provide a device that may be manually conditioned or may be equipped with a self-contained filtering cartridge that may be replaced as a unit.

Other and further objects of my invention will become more apparent as the description proceeds and when taken in conjunction with the drawings in which Figure 1 is an outside view of the entire assembled device.

Figure 2 is a fragmentary cross-sectional view of the assembled device as shown in Figure 1.

Figure 3 is a cross-section of the cylindrical body of the device showing the inwardly extending members employed for supporting the upper filter screen.

Figure 4 is a similar view as shown in Figure 3, showing the inwardly extending members for supporting the lower filter screen.

Figure 5 is a top or plan view of the filtering screen.

Figure 6 is a cross-sectional view of the filtering screen as shown in Figure 5.

Figure 7 is an outside view of the filtering cartridge.

Figure 8 is a cross-sectional view of the device showing a filtering cartridge in place, and Figure 9 is a fragmentary cross-sectional view of the cartridge unit with the filtering screens and filtering material in position.

Similar characters of reference indicate corresponding parts throughout the several views, and referring now to the same, the character 10 shows a cylindrical body that has a semi-spherical bottom member 11 at its lower end, and this bottom member may be any shape or contour having radial ends, and an annular flange member 12 welded to its open upper end. There is a flange 13 provided with apertures corresponding with apertures within the annular flange 12, and these apertures act as a means for inserting screws 14 for retaining the top flange 13 in position.

Obviously, a gasket shown as 15 is inserted between the annular flange member 12 and the closed top flange 13 to seal the entire unit. The top flange 13 is shown provided with an outlet tube shown as 16, and the semi-spherical bottom member 11 is provided with an outlet member 17 which terminates into a standard shown as 18 at the bottom for the support of the entire unit. The inner wall of the cylindrical body 10 is provided near its top with inwardly extending members 19 and 19' and near its lower end by inwardly extending members 20 and 20'. These inwardly extending members act as a support for filter plates shown as 21 which are provided with inwardly extending slots 22 on their outer peripheral edge. These filter plates 21 are further provided with perforated plates 23 supported by cross members 24 and are disposed for engagement with the inwardly extending members 19 and 19' at the top and 20 and 20' at the bottom. There is also a plurality of fabric sections shown as 25. These fabric sections consist of burlap or the like, and are arranged for engagement with the inner surface of the filtering plates 21. Disposed between the fabric strainers 25 is shown a mass of filtering material 26 which consists of a small particle of solid matter which is held in place by the filtering plates 21. There is an inlet 27 shown through the side wall of the cylindrical body 10 at a point below the lower filter plate 21, and the outlet 17 at the bottom of the semi-spherical bottom member 11 is provided with an outlet 28 and another tubular member 29 which is provided with a pet cock (not shown) or the like, for draining samples from the reservoir portion 30 in the bottom of the cylindrical body. This reservoir portion 30 is arranged to collect the sludge or impurity in the water which are heavy enough to settle out of the water or light enough to stay suspended in the water as the water is being filtered as it is forced upward through the filtering plates 21, the filtering fabric 25 and the filtering material 26 before it is permitted to pass out of the tubular member 16 at the top of the device.

Obviously, all inlets and outlets to the filter unit are provided with suitable valves to control the flow of water or the like within the boiler system.

It is also possible to insert a pet cock not shown within the tubular member 16 leading from the filter at a place between the filter head proper and the valve leading to the boiler or the boiler blow-off or the like in the system.

In operation the water would enter the tube 27 at the side of the filter unit 10 below the lower filter plate 21 or strainer and would permeate upward through the filter plate 21, the fabric strainer 25 and filtering material 26, and would exhaust through the tube 16 at the top of the flange member 13 acting as a top of the filtering unit.

It is also possible to open the valve in the outlet 28 at the bottom outlet 17 of the semi-spherical bottom member 11 of the unit when draining out the sludge or residue and the device may be cleaned by closing the valve in the tube 27 and reversing the action, that is, forcing the water downward through the top tube 16, thereby loosening the sludge accumulated in the filtering material 26, causing it to settle downward within the reservoir section 30 from where it may be drained through the outlet 17 at the bottom.

After the sludge has been removed, it is possible to again open the valve within the tubular member 27 at the side near the bottom of the cylindrical body assembly, to place the filter in normal operation.

It is manifest that the arrangement shown may be replaced by inserting a cartridge as shown in Figure 7, consisting of a separate cylindrical unit shell 31 in which the filtering material 26 is placed, which unit has the filter plate 21, top and bottom, and the fabric filtering material 25 disposed next to the plates 21.

By using a cartridge of this type it is only necessary to remove the flange 13 at the top so that the cartridge may be lifted out by means of the handle 32 and replaced with a new or clean cartridge in which the accumulation has been forced out by means of air or water pressure. However, when the cartridge type of refill is not used, it is quite possible to remove the entire unit from the circulating system temporarily while it is taken apart and the filtering material replaced by fresh or washed products so that the filter may again be placed in service for full efficiency.

While I have shown a particular arrangement of the parts constituting the device, I am fully aware of the fact that the parts may be arranged in a different manner without effecting the operativeness of the device, and I reserve the privilege to change the arrangement of the parts as well as their shape or contour, without effecting its efficiency and without changing the spirit of my invention or the scope of the appended claim.

Having thus described the invention, what I claim and desire to secure by Letters Patent in the United States is:

A filtering device of the character described comprising a hollow container open at its upper end, a removable cover for closing the open end of said container, an inlet tube leading through the side wall of said container, an outlet tube leading from the removable cover at its upper end, a drain tube at the bottom of said container, the inner wall of said hollow container provided with inwardly extending members above said inlet tube, a detachable cylindrical filtering unit mounted within said hollow container and supported by said inwardly extending members, said cylindrical unit provided with a pair of perforated filter plates spaced apart from one another, said plates supported within said filtering unit, said plates having filtering units constructed of a plurality of layers of fabric overlying said plates and a mass of filtering material disposed between said filtering plates in a manner to fill the space between the fabric filter units on the face of said plates.

BEN WHITEHOUSE.

REFERENCES CITED

The following references are of record in the file of this patent:

UNITED STATES PATENTS

| Number | Name | Date |
|---|---|---|
| 188,274 | Woolsey | Mar. 13, 1877 |
| 197,428 | Thierman | Nov. 20, 1877 |
| 314,257 | Miner | Mar. 24, 1885 |
| 555,685 | Edgington | Mar. 3, 1896 |
| 556,003 | Harris | Mar. 10, 1896 |
| 594,695 | Hunter | Nov. 30, 1897 |
| 617,177 | Nickey | Jan. 3, 1899 |
| 619,303 | Hayden et al. | Feb. 14, 1899 |
| 813,517 | Pfautz | Feb. 27, 1906 |
| 1,162,455 | Collins | Nov. 30, 1915 |
| 1,917,127 | Hughson | July 4, 1933 |
| 2,065,658 | Compton | Dec. 29, 1936 |
| 2,359,985 | Gordon | Oct. 10, 1944 |
| 2,381,354 | Larson | Aug. 7, 1945 |
| 2,486,389 | Clark | Nov. 1, 1949 |